(12) United States Patent
Behrens et al.

(10) Patent No.: US 6,615,287 B1
(45) Date of Patent: Sep. 2, 2003

(54) MEANS FOR FLEXIBLE KEYBOARD AUTO-ID IMPLEMENTATION

(75) Inventors: Louis Edward Behrens, Rochester, MN (US); Raymond Francis Roman, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/576,850

(22) Filed: May 23, 2000

(51) Int. Cl.$^7$ .................................................. G06F 3/00
(52) U.S. Cl. ................... 710/8; 710/2; 341/22; 341/26; 341/28
(58) Field of Search ............... 710/2, 8; 341/28, 341/22, 26

(56) References Cited

U.S. PATENT DOCUMENTS

| | | | |
|---|---|---|---|
| 4,459,581 A | | 7/1984 | Wilson et al. |
| 5,214,785 A | * | 5/1993 | Fairweather ............ 710/67 |
| 5,856,795 A | | 1/1999 | Arnold et al. |
| 5,859,599 A | * | 1/1999 | Shiga ...................... 341/21 |
| 5,973,675 A | * | 10/1999 | Joto et al. ................ 345/168 |
| 6,072,472 A | * | 6/2000 | Shiga ...................... 345/168 |

* cited by examiner

Primary Examiner—Jeffrey Gaffin
Assistant Examiner—Eron Sorrell
(74) Attorney, Agent, or Firm—Bracewell & Patterson LLP; Roy W. Truelson

(57) ABSTRACT

A self-identifying keyboard is provided with customization logic which allows the keyboard processor to assign a keyboard identification (ID) value. The keyboard processor is interconnected to a data channel interface adapted to communicate with a host system. The host system can send a query for the ID value, via the data interface, and the keyboard processor can retrieve the ID value from a non-volatile memory, and transmit it back to the host system via the data channel interface. This customization approach simplifies system integration, by letting the host system automatically learn the keyboard type. The ID value may indicate a particular language of the keyboard. At the time of final system assembly, the same host system, or another suitably programmed manufacturing system can be used to assign the keyboard ID, when it is known what language or other unique functionality is used in the end-user product.

21 Claims, 3 Drawing Sheets

MEANS FOR FLEXIBLE KEYBOARD AUTO-ID IMPLEMENTATION

BACKGROUND OF THE INVENTION

1. Field of the Invention

The present invention generally relates to computer systems, specifically, input devices for a computer system, such as a graphical pointing device (mouse) or keyboard, and more particularly to an improved system for automatically identifying what type of keyboard (i.e., language) is attached to the computer.

2. Description of the Related Art

A conventional computer system includes a microprocessor, or central processing unit (CPU), connected to several peripheral devices, and to a system memory device (random access memory or RAM). The peripheral devices typically include a permanent storage device (such as a hard disk drive or HDD), and several input/output (I/O) devices for the user interface. The I/O devices further include a display monitor providing video output, a keyboard allowing the user to input textual data, and a graphical pointing device (e.g., a mouse) allowing selection of graphical objects on the video display.

In early computer systems, peripheral devices (particularly keyboards) were fairly simple, and were connected to an "expansion bus" such as the "XT" bus. When a key on the keyboard was depressed, an electrical signal was passed to the CPU via the expansion bus. Personal computers (PCs) that are "IBM-compatible" use scon codes for the keyboard signals. For example, the scan code for the Return (Enter) Key is the x5A (90 decimal).

As computer systems have grown in complexity, so have keyboards and the I/O interfaces. Modern computer systems have several buses, and bus bridges, which connect the keyboard to the CPU. In many PC's, a system bus interconnects the CPU with a peripheral component interconnect (PCI) bus, which in turn is interconnected with an industry standard architecture (ISA) bus. The keyboard connects to the ISA bus. The keyboard is able to communicate with the ISA bus bridge, without the immediate involvement of the CPU. In other words, the bus bridge can act as a bus "master" to relay keystrokes to the rest of the system.

The earliest keyboards were purely alphanumeric, that is, they provided only letters, numbers, and the few special punctuation symbols that were found on typewriters. Modern keyboards, such as the "101" type keyboards, provide many additional keys, such as control keys used in combination with other keys (e.g., the "control" and "alt" keys), and programmable ("function") keys, and may further provide a numeric keypad integrated with the remainder of the keyboard.

Since computers are now used around the world, they must be able to support a wide variety of languages. These languages are not limited to those which use common English letter (Roman script), but further extend to languages using other alphabetical scripts, or ideograms. In order to support these different languages, a variety of key symbols and keyboard layouts are required. Providing diverse keyboard configurations presents several problems, for both keyboard manufacturers and system (CPU) designers.

Keys having different characters or symbols which are printed or engraved may be selectively placed on a keyboard in a relatively simple manner. Modern keyboards provide a base plate with the electrical connections (switches) for each possible key, and the keypads are then mounted on the base plate over the appropriate, respective key switches. Thus, a single keyboard (base plate) design may be used for multiple languages, and suitable keys may be applied at the factory according to the language desired for a particular keyboard. Often times, keyboards with blank keytops are shipped to system integration centers, which then print language-specific glyphs onto the keys.

Unfortunately, however, the keyboard electronics generally are unaware of what language is actually imprinted on the keys. Rather, the local keyboard electronics merely report the scan code for the physical location of a key switch. It is accordingly necessary for the end user of the system to inform the operating system of what type of keyboard is being used. This requirement can be bothersome, and can lead to operator error.

Once the layout or language type is determined, the operating system associates a particular translation table to convert scan codes from that layout into coded character sets, typically ASCII. Current data processing systems provide "self-identifying" keyboards that electronically relate to the attached system the type (language) of keyboard being used. FIG. 1 illustrates an example of such a keyboard, which is disclosed in U.S. Pat. No. 4,459,581. That keyboard 1 includes a plurality of keys 2 which are connected to control logic 3 using sense and excitation lines. Control logic 3 is also connected to a light-emitting diode (LED) or bell logic circuit 4. A language identification (ID) circuit 5 is connected to the excitation lines. When a reset signal is sent to control logic 3, the excitation lines operate as inputs to control logic 3 and pass a language identifying signal from language ID logic 5. The language identification information is then used by the attached system to decipher the meaning of particular keystrokes.

Current self-identifying keyboards use mechanical jumpers or similar means to provide the language ID information. This information is fixed at the original keyboard electronics manufacturing site. For example, the language ID circuit 5 of FIG. 1 uses a plurality of single-pole, single-throw switch elements which are physically set at the factory. This requirement, however, means that a given keyboard, upon exiting the factory, may support only one language, i.e., a system integrator no longer has the ability to customize the keyboard for different languages. It would, therefore, be desirable to provide an improved method of identifying keyboards. It would be particularly advantageous if the method could be performed without physical manipulation of keyboard components, i.e., without opening logic unit covers, and at a system integration site, without requiring special equipment.

SUMMARY OF THE INVENTION

It is therefore one object of the present invention to provide an improved computer system.

It is another object of the present invention to provide a self-identifying keyboard for a computer system.

It is a further object of the present invention to provide such a self-identifying keyboard which may easily be customized very near the end of the system integration process.

The foregoing objects are achieved in a method of making a self-identifying keyboard, generally comprising the steps of locating a plurality of keyboard switches on a keyboard base plate, the switches being operatively connected to a keyboard processor, electrically interconnecting the keyboard processor to a data channel interface adapted to communicate with a host system, and encoding a keyboard identification (ID) value in a storage device of the keyboard processor, using the data channel interface. The keyboard value may be written to a non-volatile memory. The encoding may occur during a final check-out procedure of a computer system having the host system connected to the data channel interface. The command to write the keyboard ID value, as well as the value itself, can be transmitted via the data channel interface.

Customization logic for assigning the keyboard ID value may be loaded into the keyboard processor from a read-only memory. The customization logic and storage device may be designed to allow only one assignment of a valid ID value. The ID value may be used to identify, e.g., the keyboard language.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
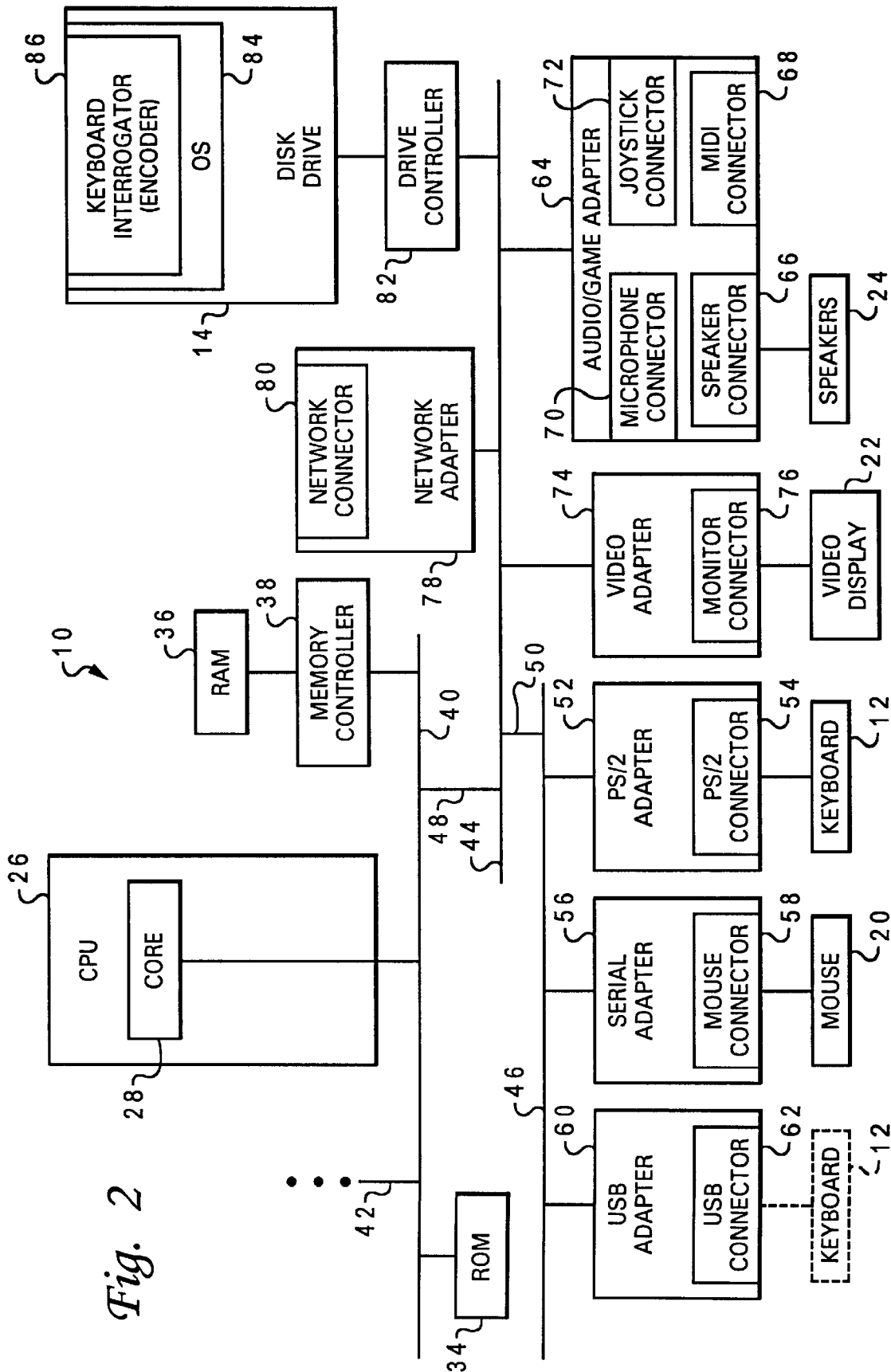
FIG. 2 is a block diagram of one embodiment of a computer system constructed in accordance with the present invention, having a self-identifying keyboard, and related software.
Figure 3:
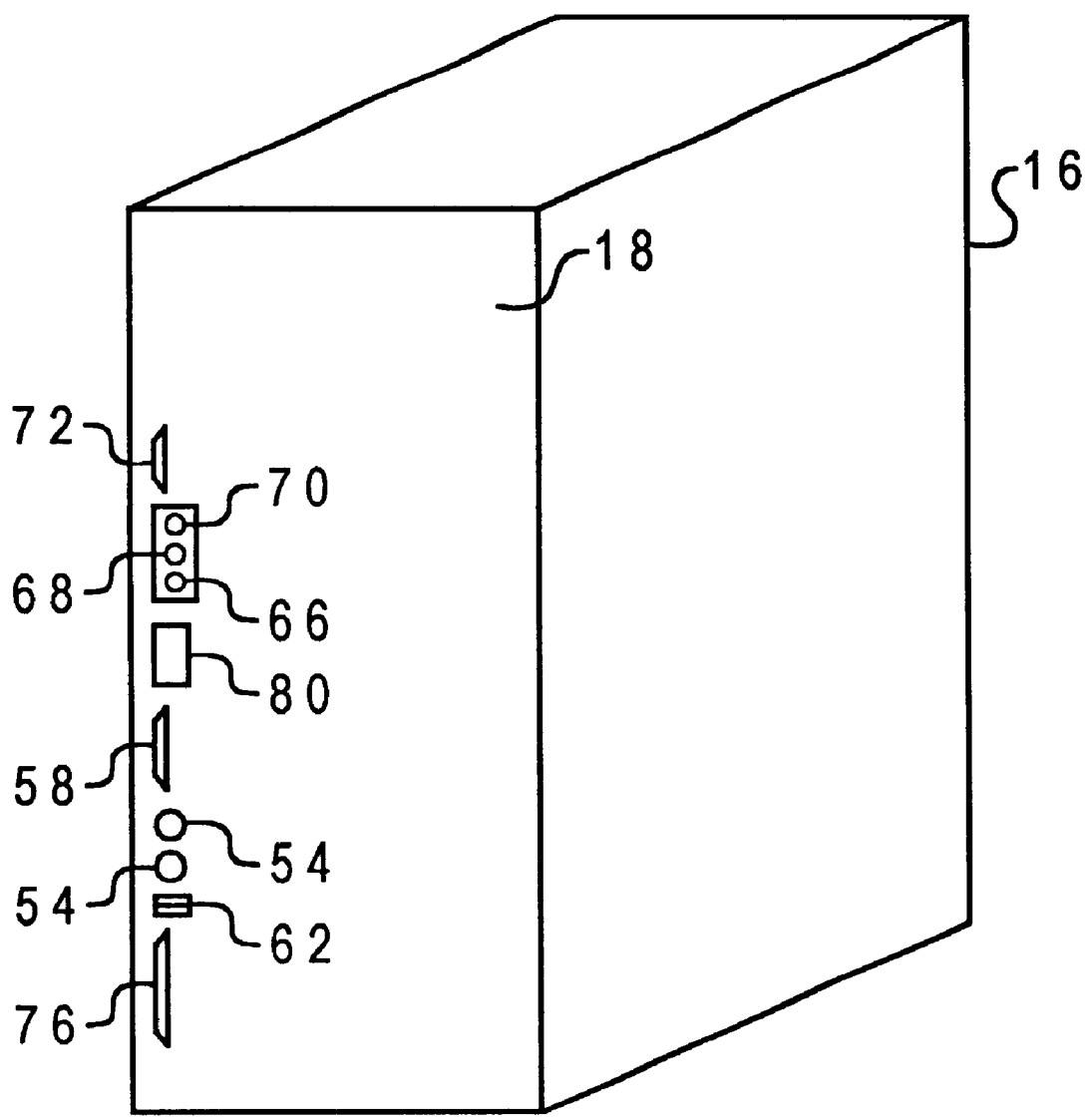
FIG. 3 is a rear perspective view of a system unit of the computer system of FIG. 2.

With reference to FIGS. 2 and 3, there is depicted one embodiment 10 of a computer system constructed in accordance with the present invention. Those skilled in the art will appreciate that many of the components of computer system 10, as hereinafter described, may individually constitute off-the-shelf components. At least one of these components, however, includes novel functionality relating to the customization of an input/output (I/O) device. In the illustrative embodiment, the novel components include a self-identifying keyboard 12, and a storage device 14 which contains software code for interfacing with self-identifying keyboard 12.

FIG. 2 illustrates various components of computer system 10 as a block diagram, while FIG. 3 illustrates a system unit of computer system 10 from a rear perspective, depicting a chassis 16 and a rear panel 18 having several connectors mounted thereon. Most of the components shown in FIG. 2 are contained within chassis 16. Those components which are not contained within chassis 16, and are not shown in FIG. 3, include keyboard 12, a graphical pointing device (e.g., mouse) 20, a video display (monitor) 22, and speakers 24.

The heart of computer system 10 is a microprocessor, or central processing unit (CPU) 26 which, in the exemplary embodiment, includes a processor core 28. CPU 26 is used to execute program instructions which may be provided by the start-up procedures in a read-only memory (ROM) 34, or by operating system software or application programs in a random-access memory (RAM) 36. RAM 36 is connected to CPU 26 via a memory controller 38 and a system bus 40. CPU 26 may be, e.g., the Power PC™ processor provided by International Business Machines Corporation (IBM). More than one CPU may be used, as indicated at 42.

Computer system 10 may have various interconnection configurations. In the embodiment of FIG. 2, two additional buses are provided, a PCI bus 44, and an ISA bus 46. PCI bus 44 is connected to system bus 40 via a PCI bus bridge 48, and ISA bus 46 is connected to PCI bus 44 via an ISA bus bridge 50.

Various peripheral devices are connected to these buses. A PS/2 adapter 52 is connected to ISA bus 46. PS/2 adapter 52 has a PS/2 connector 54 which may receive one of several devices, particularly, self-identifying keyboard 12. A serial adapter 56 is also connected to ISA bus 46. Serial adapter 56 has a serial connector 58 which may again receive one of several devices, particularly, mouse 20. Various other interconnection adapters may be connected to ISA bus 46, such as a universal system bus (USB) adapter 60. USB adapter 60 has a USB connector 62 which may also be connected to one of several devices. In an alternative embodiment, keyboard 12 is connected to USB connector 62. Keyboard 12 is discussed below in conjunction with FIG. 4.

An audio-game adapter 64 is connected to PCI bus 44. Audio-game adapter 64 has several ports, including an audio output connector 66, an audio input (MIDI) connector 68, and microphone input connector 70, and a joystick connector 72. It is not necessary that each of these connectors receive a device; in the example illustrated, only speaker 24 are connected to audio output connector 66. A video adapter 74 is also connected to PCI bus 44. Video adapter 74 has a monitor connector 76 which is connected to video display 22. A network adapter 78 may be used, via network connector 80, to access various types of networks, such as a local area network (LAN), or the Internet.

A drive adapter 82 is used to control one or more storage devices, such as hard disk drive (HDD) 14 which permanently records information (program instructions and oper- and data) magnetically, and provides the information as requested to system memory 36. HDD 14 provides an operating system (OS) 84 which is loaded by the start-up procedure in ROM 34. In the illustrative embodiment, OS 84 includes a keyboard interrogator 86 which is used for automatic identification of keyboard 12.

As explained further below, keyboard 12 includes a means for encoding an identification (ID) value. The keyboard ID value may be used to indicate various characteristics of the keyboard, such as physical layout (placement and number) of keys on the top of the board, or the language of the letters or glyphs printed on the keys. In this manner, when the keyboard is attached to the end-user's system (system IO), the keyboard can be queried by keyboard interrogator 86, and can then provide the keyboard ID code. The user no longer is required to enter the language of the keyboard, simplifying initial system setup and configuration. The keyboard ID code may be used not only to read the proper key scan codes, but also to set other operating environment parameters, such as country specific information, monetary symbols, a date/time format, etc.

Figure 1:
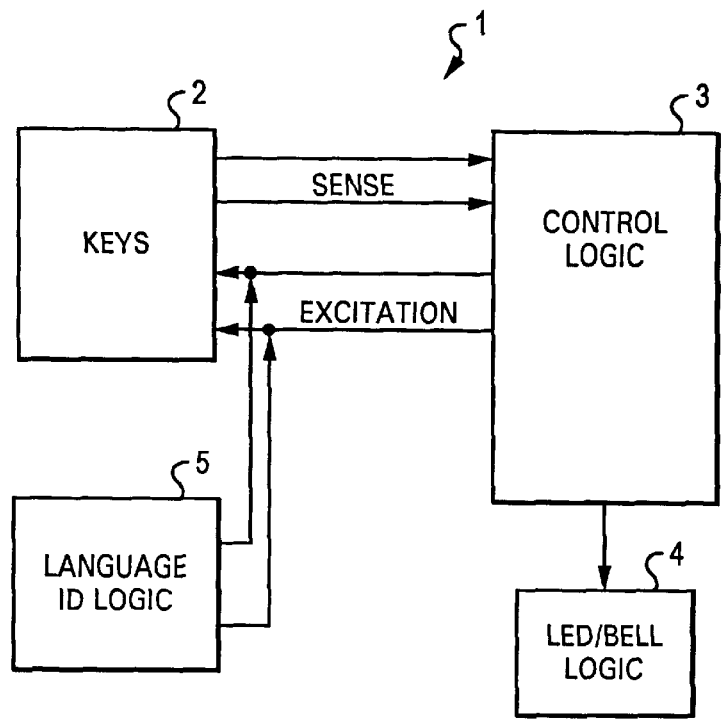
FIG. 1 is a block diagram of electronic components of a conventional keyboard.
Figure 4:
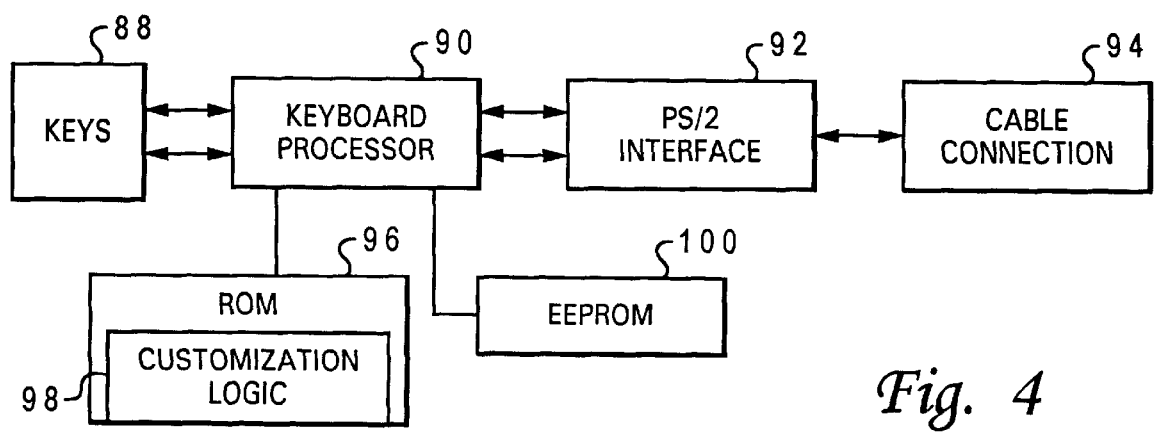
FIG. 4 is a block diagram of one embodiment of the self-identifying keyboard of the present invention.

Keyboard 12 is shown in further detail in FIG. 4. Keyboard 12 includes a plurality of keys 88 which are connected to a keyboard processor 90. Keyboard processor 90 communicates with PS/2 adapter 52 via a PS/2 interface 92 which is connected to a cable connector 94 that mates with PS/2 connector 54.

Keyboard 12 further includes a read-only memory 96 which provides operating instructions to keyboard processor 90. ROM 96 includes customization logic 98 relating to the keyboard ID value. Customization logic 98 instructs keyboard processor 90 to respond to a request for the keyboard ID value, by retrieving this value from a non-volatile memory device, such as electronically-erasable, programmable read-only memory (EEPROM) 100.

The customization logic can accept an initialization keyboard ID from a manufacturing system. The keyboard ID value in EEPROM 100 may alternatively be initially set by using the same channels in PS/2 interface 92 that are used to transmit data from keyboard 12. A different computer system may be used to transmit the appropriate bit streams over the data channels. This computer system may be similar to computer system 10, but would having a software-implemented keyboard encoder instead of an interrogator, as indicated in parenthesis in block 86 of FIG. 2 (the encoder could be part of an application program rather than the OS). The keyboard encoder may be used during final system checkout, by the system integrator, after the keyboard has been fully assembled and engraved. The keyboard encoder application may or may not be shipped as part of an end-user package. Typically, it would not be included as part of the shipped product. The EEPROM space may optionally be one-time programmable, if keyboard processor 90 is suitably programmed, to disallow any further resetting of the keyboard ID code, once a valid ID has been stored. The validity of an ID code may be determined by keyboard processor 90 using customization logic 98. EEPROM 100 is initialized to a known "zeroed" content at the point of initial keyboard manufacture, or with initial EEPROM manufacture.

In physical form, keyboard 12 may be generally similar to existing keyboards, such as the "101" keyboard. The invention is not, however, limited to any particular configuration. Indeed, the keyboard might even be adapted for a non-programmable "dumb" terminal, i.e., one which does not have a general-purpose processing unit, but rather merely provides basic interconnection to a remote data processing host (such as a "5250" keyboard)

The present invention provides several advantages over prior art keyboards. Keyboards used in the art are relatively expensive, because they are manufactured with a predetermined ID associated the logic unit (typically using either a jumper, or a one-time programmable microprocessor. Since each ID must be managed by the original manufacturing process, including inventory controls and expenses associated with each part number from the point of origin, supply chain delays can create difficulty in providing rapid turn-around by system integrators during changing marketplace demands. In contrast, the present invention can defer customization until just before the system unit is packaged with the keyboard. This approach eases inventory management, and provides quick reaction to changing geographic product volume demands. No special tools are required for customization, and even the using system itself can be used to program the keyboard ID, during final system check-out. Moreover, the encoding procedure is not physically invasive, i.e., it does not require the removal of any logic unit covers.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of making a self-identifying keyboard, comprising the steps of:

locating a plurality of sensors on a keyboard base plate, the keyboard switches being operatively connected to a keyboard processor;

electrically interconnecting said keyboard processor to a data channel interface adapted to communicate with a host system;

communicating keyboard identification data from said host system to said keyboard processor over said data channel interface; and responsive to said communicating step, encoding a keyboard identification (ID) value in a non-volatile storage device of the keyboard processor, using the keyboard identification data received by said keyboard processor from said host system over said data channel interface.

2. The method of claim 1 wherein said encoding step occurs during a final check-out of a computer system having the host system connected to the data channel interface.

3. The method of claim 1 wherein said keyboard identification data received by said keyboard processor over said data channel interface comprises said keyboard ID value.

4. The method of claim 1 wherein said keyboard identification data received by said keyboard processor over said data channel interface comprises a command, from the host system, to write the keyboard ID value.

5. The method of claim 4 wherein said encoding step is further performed in response to the step of the keyboard processor determining that a valid keyboard ID value has not previously been assigned to the storage device.

6. The method of claim 4 further comprising the step of the keyboard processor loading customization logic for assigning the keyboard ID value, from a read-only memory of the keyboard processor.

7. The method of claim 4 wherein said encoding step is further performed in response to the step of the keyboard processor receiving the keyboard ID value from the data channel interface.

8. The method of claim 1 further comprising the steps of:

receiving a query for the keyboard ID value from the data channel interface; and in response to said receiving step, transmitting the keyboard ID value to the data channel interface.

9. The method of claim 8 further comprising the step of issuing the query by an operating system of the host system as part of a system setup procedure.

10. The method of claim 1 further comprising the steps of:

mounting a plurality of keys, respectively, to the sensors; and marking the keys with a particular language, wherein the keyboard ID value identifies the particular language.

11. The method of claim 1 further comprising the step of associating a keyboard characteristic with the sensors, wherein the keyboard ID value identifies the keyboard characteristic.

12. A self-identifying keyboard comprising:

keyboard processor;

a keyboard baseplate having a plurality of keyboard switches operatively connected to said keyboard processor;

a data channel interface adapted to communicate with a host system, and connected to said keyboard processor; and data storage operatively coupled to said keyboard processor, said data storage storing control instructions executable on said keyboard processor, said control instructions writing a keyboard identification (ID) value in a non-volatile storage area of the keyboard responsive to receiving keyboard identification data from said host system over said data channel interface.

13. The self-identifying keyboard of claim 12 wherein said control instructions write the keyboard ID value during a final check-out procedure of a computer system having the host system connected to said data channel interface.

14. The self-identifying keyboard of claim 12 wherein said control instructions write the keyboard ID value in response to said keyboard processor receiving the keyboard ID value from said data channel interface.

15. The self-identifying keyboard of claim 12 wherein said control instructions write the keyboard ID value in response to said keyboard processor receiving a command, from said data channel interface, to write the keyboard ID value.

16. The self-identifying keyboard of claim 15 wherein said control instructions write the keyboard ID value in response to said keyboard processor determining that a valid keyboard ID value has not previously been assigned to the storage device.

17. The self-identifying keyboard of claim 15 wherein said control instructions write the keyboard ID value in response to said keyboard processor receiving the keyboard ID value from said data channel interface.

18. The self-identifying keyboard of claim 12 further comprising means for transmitting the keyboard ID value to said data channel interface in response to said keyboard processor receiving a query from said data channel interface.

19. A computer system having the self-identifying keyboard of claim 18 connected to the host system, wherein said host system includes an operating system having instructions for issuing the query as part of a system setup procedure.

20. The self-identifying keyboard of claim 12 further comprising a plurality of keys mounted, respectively, to said keyboard switches, wherein said keys are marked with a particular language, and the keyboard ID value identifies the particular language.

21. The self-identifying keyboard of claim 12 wherein:
a keyboard characteristic is associated with said sensors; and
the keyboard ID value identifies the keyboard characteristic.

* * * * *